United States Patent [19]

Kurosawa et al.

[11] Patent Number: 5,042,024
[45] Date of Patent: Aug. 20, 1991

[54] DISK REPRODUCTION APPARATUS CAPABLE OF BEING DISPOSED IN DIFFERENT ATTITUDES

[75] Inventors: Atsushi Kurosawa; Toshiyuki Kimoto; Sei Onishi; Kiyohito Kajihara, all of Kawagoe, Japan

[73] Assignee: Pioneer Electronic Corporation, Tokyo, Japan

[21] Appl. No.: 482,611

[22] Filed: Feb. 21, 1990

[30] Foreign Application Priority Data

| Apr. 28, 1989 | [JP] | Japan | 1-109663 |
| Apr. 28, 1989 | [JP] | Japan | 1-109664 |
| Apr. 28, 1989 | [JP] | Japan | 1-109665 |
| Apr. 28, 1989 | [JP] | Japan | 1-109666 |

[51] Int. Cl.[5] .................................................. G11B 33/02
[52] U.S. Cl. ................................ 369/75.1; 369/75.2
[58] Field of Search ................... 369/75.1, 258, 263, 369/247; 360/97.02, 137

[56] References Cited

U.S. PATENT DOCUMENTS

| 4,071,252 | 1/1978 | Gillespie | 369/263 X |
| 4,553,231 | 11/1985 | d'Alayer d'Arc | 369/263 |
| 4,794,588 | 12/1988 | Yoshitoshi | 369/263 |
| 4,831,476 | 5/1989 | Branc et al. | 369/75.1 X |
| 4,937,806 | 6/1990 | Babson et al. | 369/75.1 |

Primary Examiner—Stuart S. Levy
Assistant Examiner—Kenneth B. Wells
Attorney, Agent, or Firm—Sughrue, Mion, Zinn, Macpeak & Seas

[57] ABSTRACT

A disk reproduction apparatus of the type capable of being displaced from a horizontal attitude to a vertical attitude or vice versa includes an outer casing; a support frame disposed inside the outer casing in a floating manner and loaded with a magazine in which a compact disk is mounted; a vibration proof mechanism disposed between the corresponding side surfaces of the outer casing and the support frame; and a pickup device disposed above the compact disk, and being movable and adapted to read the information recorded on the compact disk. The vibration proof mechanism includes a support, such as a rotating plate, pivotally secured to the side surface of the outer casing, and a spring having one end engaged with the pivotal rotating plate and the other end secured to the side surface, opposing to the side surface of the outer casing, of the support frame. Several vibration proof mechanisms may be disposed on both side surfaces of the outer casing and the support frame. The operation of the pickup device is controlled by a servo-controlled mechanism so as to be movable in a radial direction of the compact disk.

17 Claims, 10 Drawing Sheets

DISK REPRODUCTION APPARATUS CAPABLE OF BEING DISPOSED IN DIFFERENT ATTITUDES

BACKGROUND OF THE INVENTION

The present invention relates to a disk reproduction apparatus, particularly adapted to be loaded in a vehicle, capable of being installed in various arrangements such as horizontal or vertical fashion.

In general, a compact disk (CD) reproduction apparatus is loaded in a trunk room of a vehicle such as automobile in a horizontal or vertical fashion in view of the space in the trunk. The CD reproduction apparatus is composed of an outer casing and an inner reproduction mechanism which is supported by a support frame in a floating manner to maintain a vibration proof property. The support frame is suspended with respect to the outer casing by rubber dampers in each of which silicone oil is sealed and the side portion of the support frame is also suspended by vibration proof springs each having one end secured to the support frame and the other end attached to the outer casing.

In the CD reproduction apparatus of the type described above, the compact disk is mounted to a predetermined position in the casing and a pickup means is arranged above the compact disk to read information recorded thereon by moving the pickup means in a radial direction of the compact disk by a servo-mechanism.

As stated, it is possible to change the attitude of the conventional disk reproduction apparatus from a horizontal attitude to a vertical attitude or vice versa, and the attitude changing operation is done by changing the attaching position of one end of the vibration proof spring. This working is generally carried out by opening a cover provided for the outer casing, which involves a troublesome problem. Namely, particularly, in a case of the vertical arrangement of the disk reproduction apparatus, it is difficult to stably maintain the perpendicular position of the support frame, and in a certain case, the support frame may be suspended obliquely and the vibration applied to the support frame cannot be sufficiently absorbed by the spring means.

Furthermore, since the cover is closed after the engaging end portion of the vibration proof spring is changed, it is difficult to externally discriminate the engagement of the spring and, in an adverse case, the support frame, i.e. the disk reproduction apparatus may not be suspended pertinently.

In another point of view of the spring engaging position changing manner described above, the changing working is troublesome. The spring is released at one end and again engaged with the other position by expanding the spring, so that there is a fear of losing the resilient property of function of the spring itself.

In another aspect of the vibration proof spring suspending manner, in which both ends of the springs are released and again engaged with other engaging portions when the disk reproduction apparatus is replaced from the horizontal attitude to the vertical attitude or vice versa, the vibration proof spring is once completely removed. This working not only is troublesome but also involves a problem of losing the spring itself.

Moreover, in a case where the disk reproduction apparatus is arranged in a vertical attitude, gravity affects on the operation of the pickup device. However, the conventional CD reproduction apparatus does not include any controlling means for the servo-mechanism to solve the problem of the gravity. This sometimes affects the information reproduction operation of the apparatus and the stable tracking operation cannot be secured.

SUMMARY OF THE INVENTION

An object of the present invention is to substantially eliminate the defects and drawbacks encountered to the prior art described above and to provide a disk reproduction apparatus capable of being displaced from a horizontal attitude to a vertical attitude or vice versa without transferring a vibration to a support frame in which a compact disk is loaded and capable of being provided with a vibration proof mechanism which is not removed during the displacement of the apparatus.

Another object of the present invention is to provide a disk reproduction apparatus capable of being displaced from a horizontal attitude to a vertical attitude or vice versa and capable of detecting the change of the attitude of the apparatus and performing the reproduction operation by a pickup device which is operable in response to various attitude of the apparatus.

A further object of the present invention is to provide a disk reproduction apparatus capable of being displaced from a horizontal attitude to a vertical attitude or vice versa and capable of effectively controlling the affection of gravity to be applied to a pickup device, particularly when the apparatus is arranged in a vertical attitude.

These and other objects can be achieved according to the present invention by providing a disk reproduction apparatus capable of being displaced from a horizontal attitude to a vertical attitude or vice versa, comprising, an outer casing, a support frame disposed inside the outer casing in a floating manner and loaded with a magazine in which a compact disk is mounted, a vibration proof means disposed between the outer casing and the support frame for preventing the support frame means from vibrating when the outer casing is vibrated, a pickup device disposed adjacent the compact disk to be movable and adapted to read out information recorded on the compact disk, and a controlling means for controlling a displacement of the reading means, the vibration proof means comprising a supporting means pivotally secured to a side surface of the outer casing and a spring having one end engaged with the supporting means to be pivotal and other end sucured to a side surface, corresponding to the side surface of the outer casing, of the support frame, at least one supporting means and one spring being disposed on corresponding side surfaces of the outer casing and the support frame.

In preferred embodiments, the other end of the spring is pivotally secured to a portion lying on a horizontal plane passing a center of gravity of the support frame in a case where the disk reproduction apparatus is arranged in a horizontal attitude and the supporting means of the vibration proof means comprises a rotating plate capable of rotating about a support pin supporting the rotating plate and provided with an end portion to which the one end of the spring is secured.

The vibration proof means includes a rotation position discriminating means for discriminating a rotating position of the rotating plate from a portion external to the outer casing. A plurality of vibration proof means are disposed between corresponding side surfaces of the outer casing and the support frame. The rotaing plates are interconnected through a link member so as to be rotatable in a synchronized manner.

The disk reproduction apparatus may further comprise a detector disposed in association with the supporting means of the vibration proof means for detecting a displacement of the supporting means when the disk reproduction apparatus is changed in the attitude thereof. The reading means is a pickup device and the control means is a servo-mechanism which is operated in response to an electric signal from the detector. The pickup device is moved horizontally radially with respect to the compact disk.

According to the disk reproduction apparatus of the characters described above, at least one vibration proof means including a spring is disposed between each corresponding side surface of the support frame and the outer casing of the apparatus. The one end of the spring is secured to be pivotal at a horizontal plane passing the center of gravity of ths support frame and the other end of the spring is secured to the supporting point of the casing. The supporting point on the casing is rotated arcuately by about 90° when the attitude of the apparatus is changed. Accordingly, it is not necessary to remove or disengage the vibration proof spring from the supporting point in a case where the attitude of the disk playback apparatus is to be changed, whereby the attitude changing working can be made easy without imparting the vibration to the support frame.

When the one end of the spring is secured to be pivotal to the rotating plate attached to be rotatable to the outer casing, the vibration proof means can be rotated from the outside of the outer casing. The rotation position of the rotating plate can be discriminated by the arrangement of the discriminating mechanism, so that the rotating position of the rotating plate can be exactly visually observed and the accurate attitude of the disk reproduction apparatus can be obtained.

The attitude of the disk reproduction apparatus can be detected by the location of the detector in association with the rotating plate and the circuit constant of the pickup drive circuit of the servo-mechanism is changed in response to the electric signal generated from the detector to thereby perform the servo control of the pickup device in accordance with the attitude of the apparatus, whereby the tracking operation and the reproduction operation of the pickup device can be exactly achieved. In addition, when the pickup device is to be displaced radially with respect to the compact disk, by adjusting the displacing direction to the horizontal direction, the affection of the self-gravity of the servo-mechanism for operating the pickup device can be substantially eliminated even in the horizontal and vertical attitude of the disk reproduction apparatus.

Figure 3:
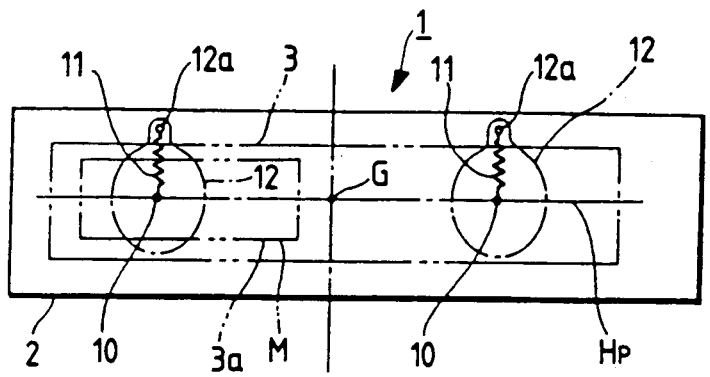
FIGS. 3 and 4 are views showing a vibration proof mechanism in a case where the disk reproduction apparatus is arranged horizontally and vertically.
Figure 4:
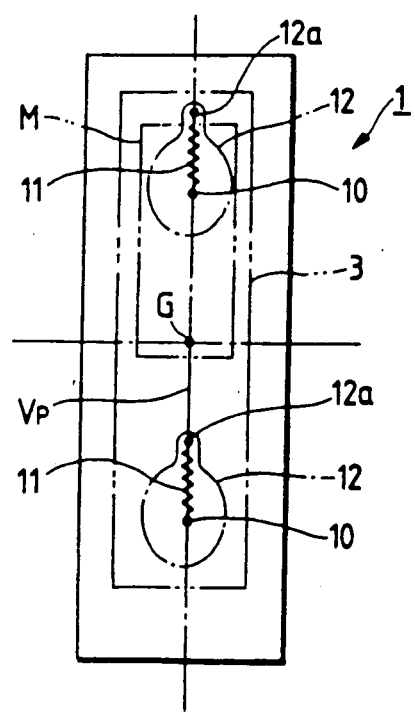
Figure 11:
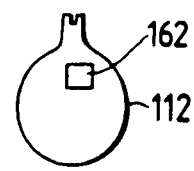
Figure 12:
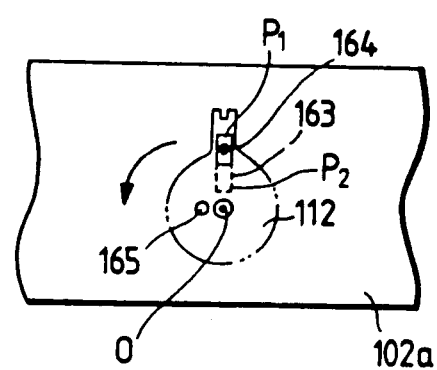
Figure 13:
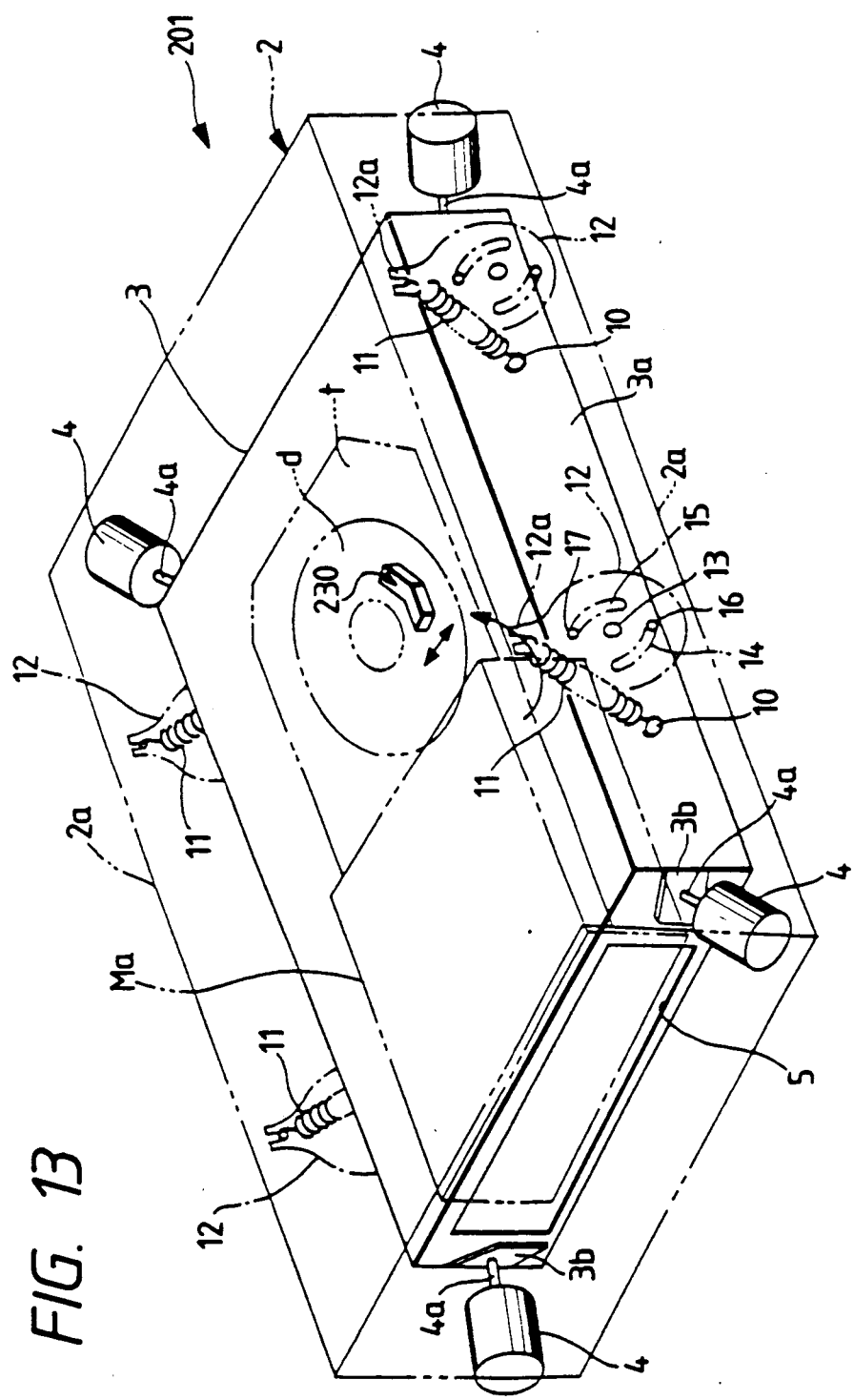
Figure 14:
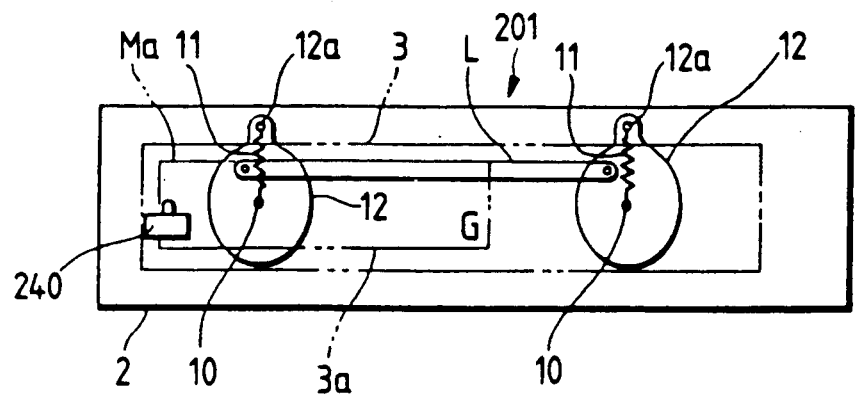
Figure 15:
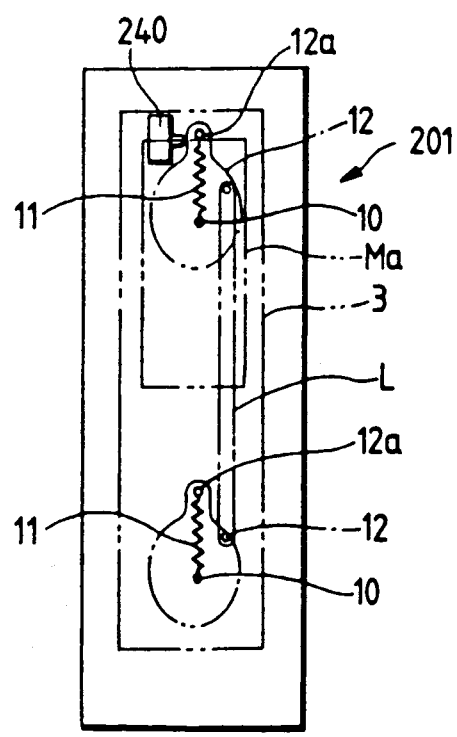
Figure 16:
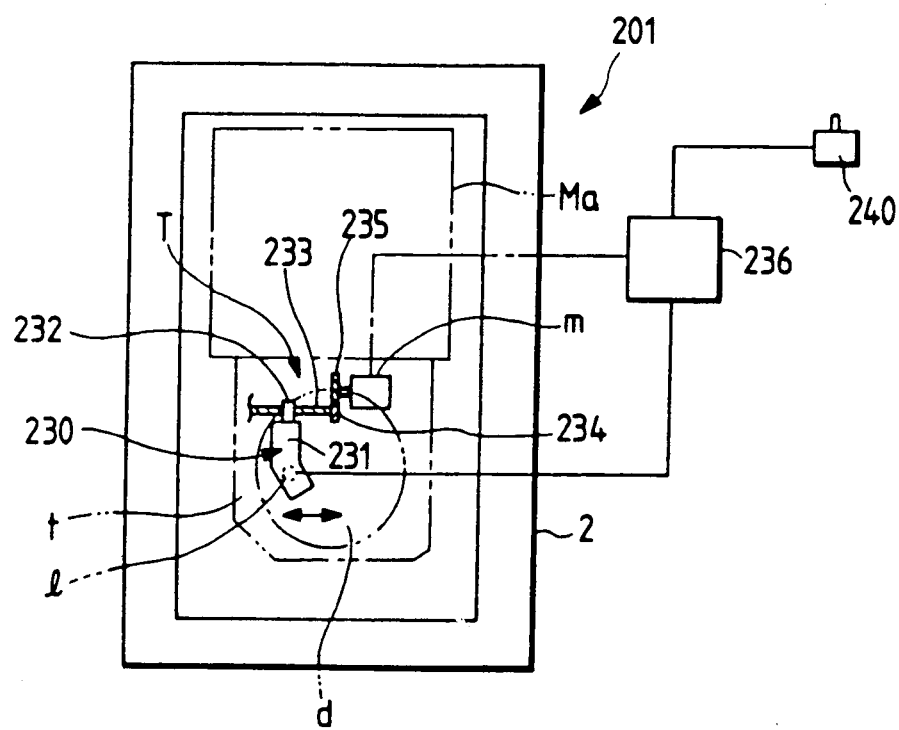
Figure 17:
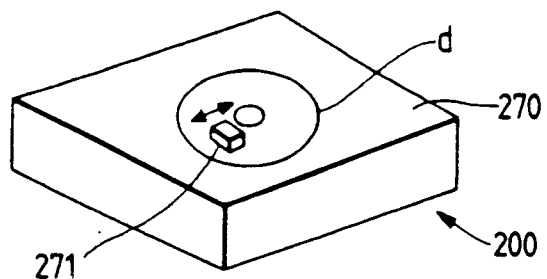
Figure 18:
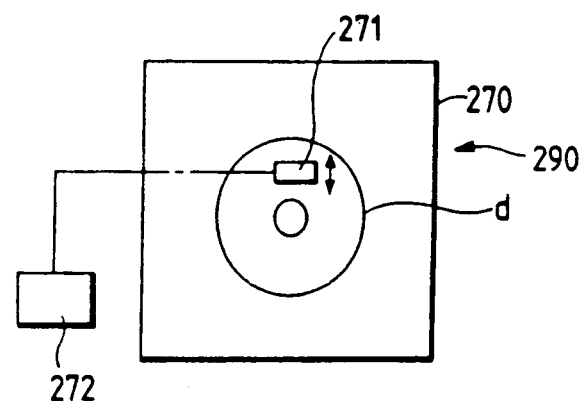
Figure 19:
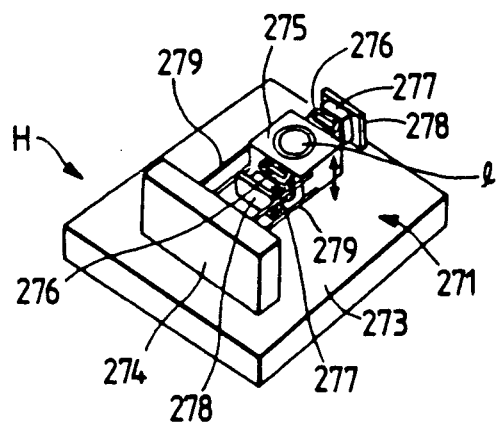
Figure 20A:
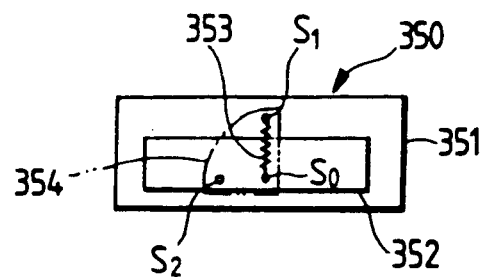
Figure 20B:
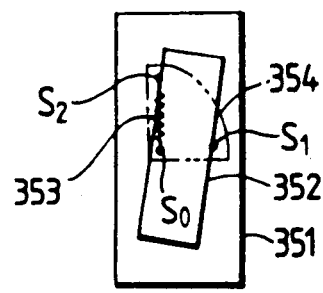
Figure 21A:
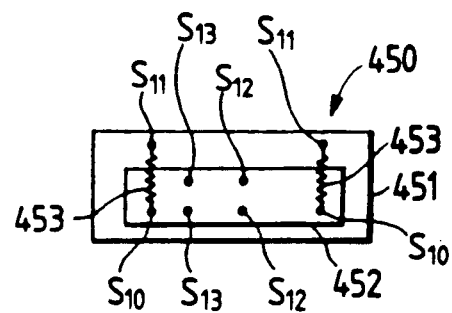
Figure 21B:
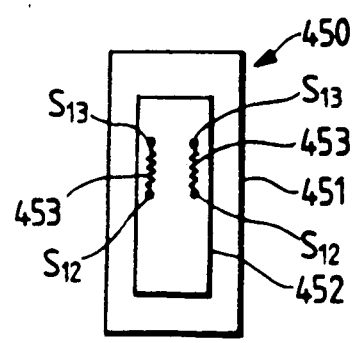

FIG. an illustration showing an position discrimination mechanism;

FIG. 11 is a plan view of the rotating plate;

FIG. 12 is an illustration of another embodiment of the position discrimination mechanism;

FIG. 13 is a schematic perspective view of a third embodiment of the disk reproduction apparatus according to the present invention;

FIGS. 14 and 15 are views similar to FIGS. 3 and 4, respectively, according to a third embodiment;

FIG. 16 is a front view of a disk reproduction apparatus in the vertical arrangement;

FIG. 17 is a brief perspective view of the domestic use conventional disk reproduction apparatus in the horizontal arrangement;

FIG. 18 is a front view of the conventional disk reproduction apparatus capable of being changed in the attitude thereof;

FIG. 19 is a perspective view of an objective lens holder;

FIGS. 20A and 20B are views similar to FIGS. 3 and 4, respectively, showing one conventional example of the vibration proof mechanism; and FIGS. 21A and 21B are views similar to FIGS. 3 and 4, respectively, showing another conventional example of the vibration proof mechanism.

DESCRIPTION OF THE PREFERRED EMBODIMENTS

In advance of the explanatory of preferred embodiments of the present invention, prior art of this technical field will be first described hereunder with reference to FIGS. 20A and 20B and FIGS. 21A and 21B for a better understanding of the present invention.

Referring to FIGS. 20A and 20B, a compact disk (CD) reproduction apparatus 350 has an outer casing 351 in which a support frame 352 is suspended by a vibration proof spring 353 at substantially the central portion thereof. A reproduction mechanism is supported by the support frame 352 for positioning and rotating the CD and reproduce the information recorded on the disk by means of a reading head. The vibration proof spring has, when the CD reproduction apparatus is arranged in a horizontal attitude, one (lower in the illustration) end connected to a supporting point $S_o$ of the support frame 352 and the other end (upper) connected to a supporting point $S_1$ formed on a support plate 354 of the outer casing 351 (FIG. 20A). In a case where it is desired to replace the CD reproduction apparatus to a vertical fashion of FIG. 20B from the horizontal fashion shown in FIG. 20A, the upper end of the vibration proof spring is disengaged from the supporting point $S_1$ of the support plate 354 to be rotated through 90°, and then hung by a supporting point $S_2$ of the supporting plate 354.

In the manner described above, in which one end of the vibration proof spring is changed in the hanging position, the vibration proof spring is replaced by disengaging one end thereof from the supporting point $S_1$ of the supporting plate 354 and then engaging the same end with the supporting point $S_2$ by rotating the spring by 90°, this working being troublsome and inconvenient.

FIGS. 21A and 21B represent the other examples of the conventional manner for suspending the supporting frame 452 in the outer casing 451 of the CD reproduction apparatus 450 by utilizing the vibration proof springs 453 and 453 in the horizontal and vertical states. Namely, referring to FIG. 21A, in which the CD reproduction apparatus is placed in a horizontal fashion, the lower ends of the vibration proof springs 453 and 453 are engaged with supporting points $S_{10}$ and $S_{10}$ positioned at both sides of the supporting frame 452 and the upper ends of the vibration proof springs 453 and 453 are engaged with the supporting points $S_{11}$ and $S_{11}$ positioned at the outer casing 451 of the CD reproduction apparatus 450. In a case where it is desired to replace the reproduction apparatus 450 in this horizontal state to the vertical state as shown in FIG. 21B, both the ends of the vibration proof springs 453 and 453 are disengaged from the supporting points $S_{10}$ and $S_{11}$ and, in place, engaged with the supporting points $S_{12}$ and $S_{12}$ of the supporting frame 452 and with the supporting points $S_{13}$ and $S_{13}$ of the outer casing of the reproduction apparatus 450. This replacing working for the vibration proof springs also involves troublesome problems, thus being inconvenient.

The present invention was conceived to solve the problems encountered to the prior art and described above and preferred embodiments of the CD reproduction apparatus according to the present invention will be described hereunder with reference to FIGS. 1 to 16.

Figure 1:
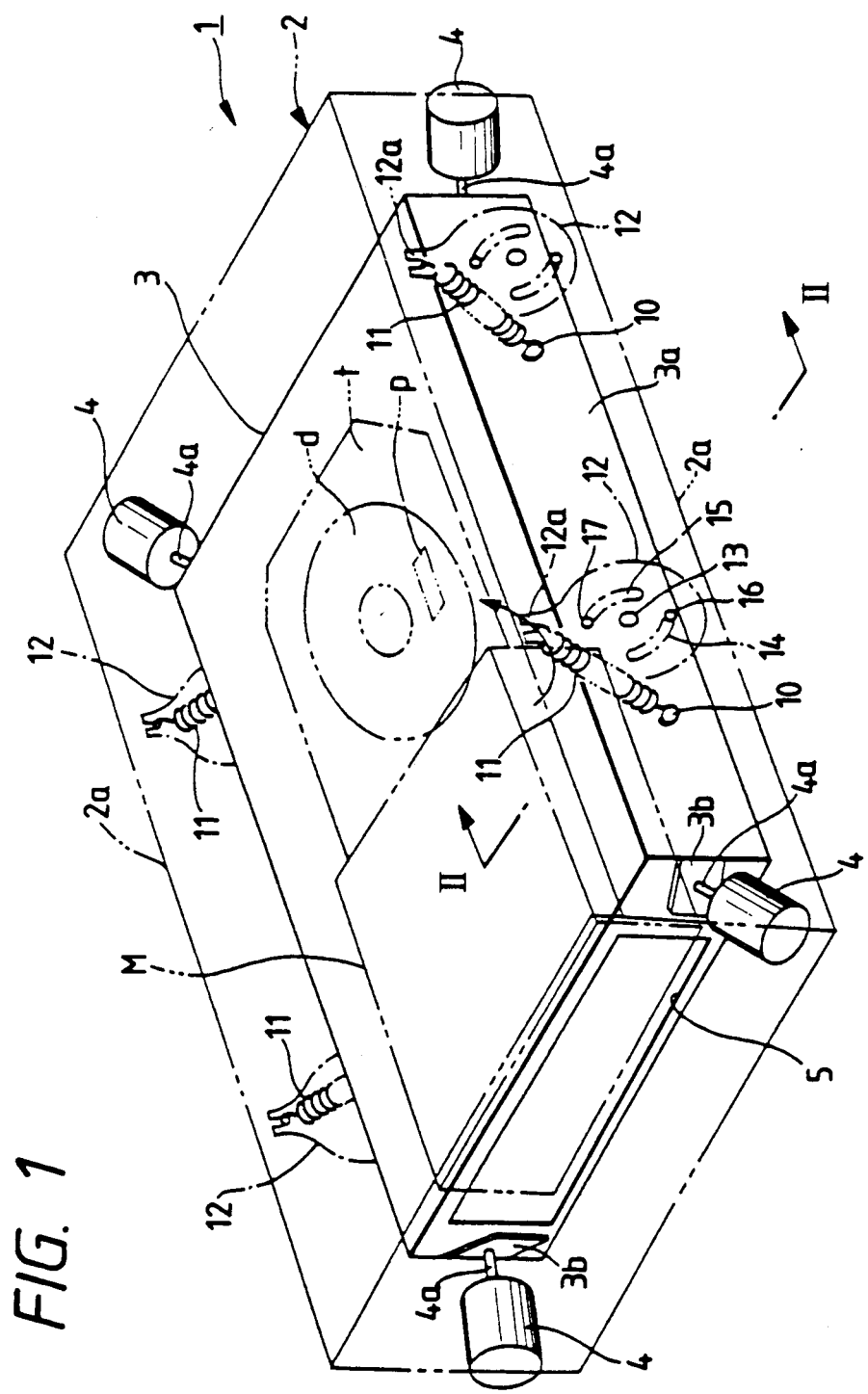
FIG. 1 is a schematic perspective view of a first embodiment of a disk reproduction apparatus according to the prevent invention.

FIGS. 1 to 4 represent a first embodiment according to this invention and, referring to FIG. 1, a disk reproduction apparatus 1 comprises an outer casing 2 in which a support frame 3 is supported in a floating manner by means of dampers 4 which are disposed at four corners thereof, respectively. Each of the dampers 4 has a front end from which extends a supporting rod 4a, which is secured to a support plate 3b provided for the support frame 3 and a rear end secured to the outer casing 2.

A magazine M is accommodated in the support frame 3. A plurality of trays are stacked on the magazine and a compact disk d is accommodated in the central portion of each tray.

The magazine M is accommodated in the support frame 3 through an opening 5 formed in the front surface of the support frame 3. After the insertion of the magazine into the supporting frame 3, the trays in the magazine M are pushed out one by one by a push-out device, not shown, and the pushed-out tray t is positioned at a portion illustrated with two-dot lines. The compact disk d is supported in this position to the tray t by means of a clamp arm, not shown, and rotated at a predetermined rotating speed, whereby the information recorded on the compact disk can be read by a pickup device P. This pickup device P is disposed above the compact disk d to be movable and adapted to read out information recorded on the compact disk d.

The disk reproduction apparatus 1 is generally utilized in a horizontal state as shown in FIG. 1 or in a vertical state by rotating the same by 90° from the horizontal arrangement. When the disk reproduction apparatus is mounted in a vehicle such as automobile, the apparatus is generally disposed in a rear trunk room of the automobile and operated by operating a control board provided for a driver's seat to push out a desired disk d to a position shown in FIG. 1 together with the tray t. The information on the disk d is read out by the pickup device P.

A pair of vibration proof springs 11 and 11 are disposed between one side surface 3a of the supporting frame 3 and one side surface 2a of the outer casing 2 opposing the side surface 3a and another pair of vibration springs are also disposed between another side surfaces of the support frame 3 and the outer casing 2. Although in FIG. 1, a pair of the vibration proof springs 11 are disposed between one side wall of the support frame 3 and one side wall of the outer casing 2, only one vibration spring 11 may be disposed therebetween. In either case of the horizontal or vertical arrangement of the disk reproduction apparatus and the side surfaces 2a and 3a are not disposed in a vertical positional relationship, but disposed side by side. The vibration proof springs 11 absorb the vibration of the support frame 3, when the automobile vibrates, in association with the dampers 4 described hereinbefore.

Figure 2:
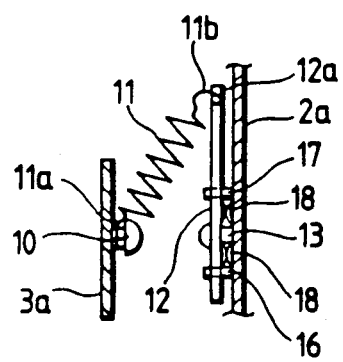
FIG. 2 is a sectional view taken along the line II—II shown in FIG. 1.

As shown in FIG. 2, the lower end 11a of each of the vibration proof springs 11 is secured to a support pin 10 fixed to the side surface 3a of the support frame 3 to be pivotal by a predetermined angle, for example, of 90°. The upper end 11b of the vibration proof spring 11 is secured to a projecting end 12a of a rotating plate 12 secured to the side surface 2a of the casing 2 to be pivotal.

As shown in FIGS. 1 and 2, the rotating plate 12 is pivoted to the side surface 2a of the outer casing 2 by means of the support pin 13 and is provided with arcuate openings 14 and 15 in a symmetric arrangement with respect to the central axis thereof. Each of the openings 14 and 15 is formed in a range so as to have 90° with respect to the central support pin 13 of the rotating plate 12. Guide pins 16 and 17 fixedly attached to the side surface 2a of the outer casing 2 are engaged with the arcuate openings 14 and 15, respectively. Such as a disc spring means 18 and 18 are further disposed between the side surface 2a of the casing 2 and the rotating plate 12 to maintain the rotating plate 12 in a predetermined position so as to be free from vibration.

The support pins 10 fixed to the side surface 3a of the support frame 3 are positioned at crossing points of the side surface 3a and the horizontal plane Hp passing the center of gravity G of the support frame 3 including the magazine M and the reproduction mechanism. In a case where the disk reproduction apparatus 1 is positioned in the horizontal arrangement, the projecting ends 12a of the rotating plate 12 adapted to be engaged with the vibration proof springs 11 are positioned vertically above the support pins 10 respectively as viewed from the side surface of the disk reproduction apparatus as shown in FIG. 3.

When it is required to replace the disk reproduction apparatus 1 from the horizontal state to the vertical state such as shown in FIG. 4, the rotating plate 12 is rotated counterclockwisely as viewed in FIG. 3 or 4 by 90° to coincide the projecting ends 12a of the rotating plate 12 and the support pins 10 with the vertical plane Vp passing the gravity center G of the support frame 3. The vertical plane Vp in the vertical arrangement of the disk reproduction apparatus corresponds to the horizontal plane Hp in the horizontal arrangement thereof. As described above, by coinciding the supporting points for the upper and lower ends of the vibration proof springs 11 with the vertical plane Vp, the vertical position of the support frame 3 can be acurately maintained and the vibration to the support frame 3 can be substantially effectively absorbed even if the disk reproduction apparatus 1 is vibrated.

In the described first embodiment, the vibration proof springs are secured to the rotating plate 12 at their one ends, but they may be secured directly to the side surface 2a of the outer casing 2 and, in this modification, the supporting points may be arcuately rotated by 90° along the side surface 2a to perform the positional replacement of the disk reproduction apparatus.

Figure 5:
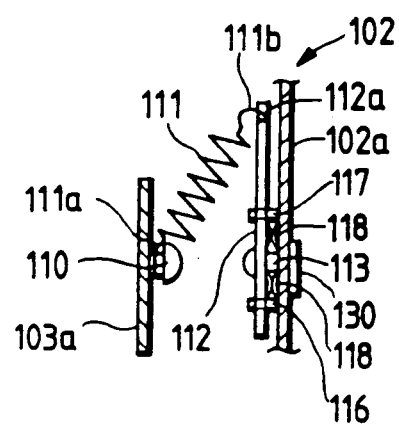
FIG. 5 is a view corresponding to FIG. 2 of the second embodiment according to the present invention.

FIGS. 5 to 12 represent a second embodiment of the disk reproduction apparatus according to the present invention, and FIG. 5 particularly shows the location and attachment of the vibration proof spring 111. Referring to FIG. 5, the lower end 111a of each vibration proof spring 111 is pivotally attached to a support pin 110 secured to the side surface 103a of the support frame and the upper end 111b of the vibration proof spring 111 is secured to a projecting end 112a of a rotating plate 112 pivotally attached to the side surface of the outer casing of the disk reproduction apparatus. The rotating plate 112 is pivoted by a support pin 113 to the side surface 102a of the outer casing 102. Arcuate openings 14 and 15 such as shown in FIG. 1 in shape of slits are formed in the rotating plate 112 in a symmetric arrangement with respect to the support pin 113 and each of the openings 14 and 15 has an arcuation having an angle of 90° with respect to the support pin 113. Guide pins 116 and 117 to be engaged with the openings 14 and 15 are secured to the side surface 102a of the outer casing 102. Plate springs 118 and 118 are disposed between the side surface 102a of the outer casing 102 and the rotating plate 112 to stably maintain the rotating plate in a predetermined position.

Figure 6:
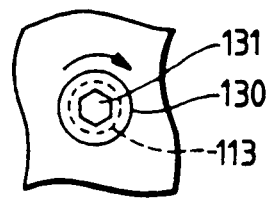
FIG. 6 is a brief plan view showing a support pin of a rotating plate.

As shown in FIGS. 5 and 6, the support pin 113 is secured to the rotating plate 112 and rotatably attached to the side surface of the outer casing 102. The support pin 113 is provided with a circular flanged portion 130 disposed on the side surface 102a of the casing 102. The support pin 113 has one outer end provided with a hexagonal recess 131 exposed to the outside of the side surface 102a of the casing 102 and, accordingly, the rotating plate 112 can be rotated by a predetermined angle, usually 90°, together, with the support pin 113 by rotating a rod member having a hexagonal cross section inserted into the recess 131.

Figure 7:
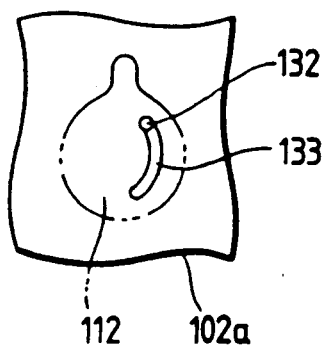
FIG. 7 is another embodiment of a rotating mechanism for the rotating plate.

FIG. 7 shows a modification for rotating the rotating plate 112 in which the rotating plate 112 is provided with a projection 132, which is engaged with an arcuate opening 133 formed in the side surface 102a of the outer casing 102 to be movable along the arcuate shape of the opening 133.

Figure 8:
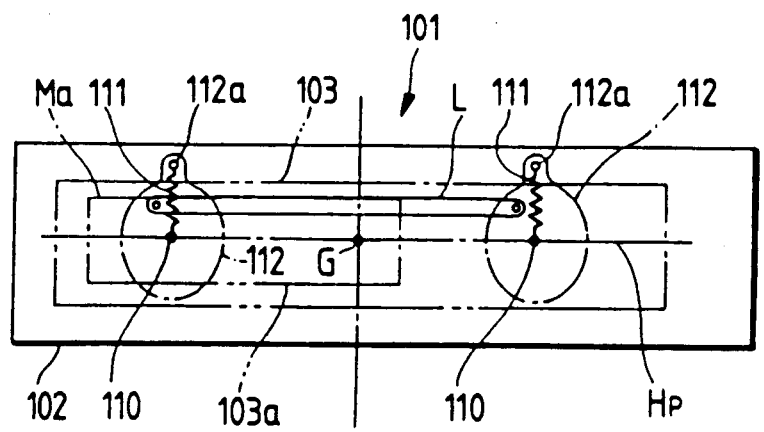
FIGS. 8 and 9 are views similar to FIGS. 3 and 4, respectively, of a second embodiment.

As shown in FIG. 8, the support pin 110 attached to the side surface 103a of the support frame 103 is positioned on a crossing line of the side surface 103a and a horizontal plane Hp passing the center of gravity G of the support frame 103 including the magazine Ma and the reproduction mechanism. In a case where the disk reproduction apparatus 101 is disposed in the horizontal arrangement, the projecting ends 112a of the rotating plate 112 for securing the vibration proof springs 111 are positioned vertically above the support pins 110 as viewed from the side surface of the disk playback apparatus 101.

Figure 9:
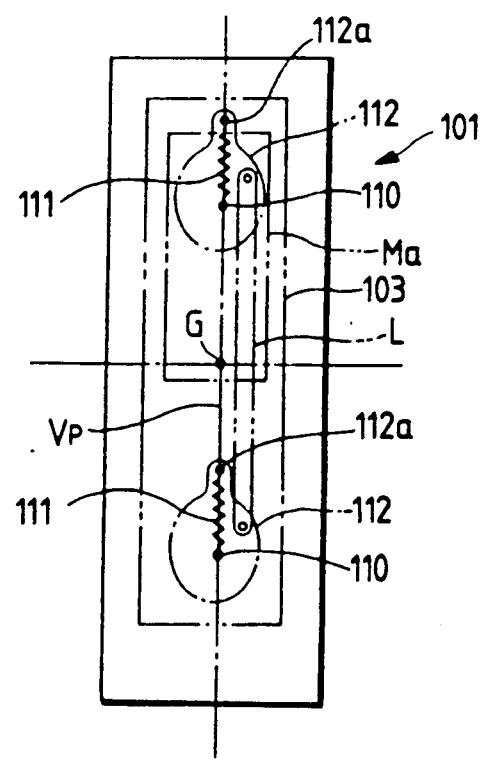

When it is required to replace the disk reproduction apparatus in the horizontal arrangement to the vertical arrangement such as shown in FIG. 9, the rotating rod is first inserted into the recess 131 formed in the end of the support pin 113 and then rotated by 90° in the counterclockwise direction as viewed in FIG. 8 or 9 so that the projecting ends 112a of the rotating plates 112 and the support pins 110 coincide with the vertical plane Vp passing the center of gravity G of the support frame 103. It will be easily noted that the horizontal plane Hp in the horizontal arrangement of the disk reproduction apparatus 101 corresponds to the vertical plane Vp in the vertical arrangement thereof. As described above, by coinciding the vertical support points of the vibration proof springs 111 with the vertical plane Vp, the support frame 103 can be exactly maintained in the vertical position and the vibration of the support frame 103 can be effectively prevented even if the disk playback apparatus 101 is vibrated.

In a modification of this embodiment, as shown in FIG. 8 or 9, both the rotating plates 112 may be connected by means of a link L and in this modification, the rotation of one rotating plate 112 by a rotating member causes to rotate other one rotating plate 112 through a rotating member by the same rotating angles such as 90°.

Figure 10:
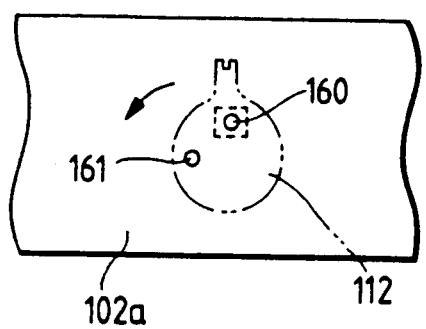

Referring to FIGS. 10 to 12, identification openings 160 and 161 are formed in the side surface 102a of the outer casing 102 in a range of the rotation of the rotating plate 112 to identify the rotating position of the plate 112 (FIG. 10). The rotating plate 112 is further provided with a discrimination portion 162 (FIG. 11) which is marked with red or blue color, for example, and when the opening 160 or 161 is in registration with the discrimination portion 162, the portion 162 can be visually identified from the external position.

Accordingly, when the disk reproduction apparatus 101 is disposed in the horizontal arrangement as shown in FIG. 10, for example, the discrimination portion 162 can be visually identified through the opening 160, whereas when the rotating plate 112 is rotated by 90° to replace the apparatus to the vertical arrangement from the horizontal arrangement, the discrimination portion 162 will be visually identified through the opening 161. Therefore, the position of the rotating plate 112 can be discriminated visually through the opening 160 or 161.

The discrimination portion may be formed in an elongated shape as a portion 163 shown in FIG. 12 so as to have an outward portion P1 colored with red, for example, and an inward portion P2 colored with blue, for example, so that the red portion P1 is in registration with the opening 164 when the disk reproduction apparatus 101 is disposed horizontally and the blue portion P2 is in registration with the opening 165 when the apparatus 101 is disposed vertically.

The position discriminating mechanism for the rotating plate 112 comprising the discrimination portions 162 and 163 and the corresponding openings 160, 161, 164 and 165 may be eliminated for the embodiment shown in FIG. 7, and in the embodiment of FIG. 7, the position of the rotating plate 112 can be discriminated by the observation of the position of the projection 132.

A usual domestic use CD reproduction apparatus of conventional type is shown in FIG. 17 which is designed to be placed in the horizontal arrangement. Referring to FIG. 17, a CD reproduction apparatus 200 comprises an outer casing 270 in which a compact disk d is mounted. A pickup device 271 is arranged above the compact disk d to be movable along the radial direction of the compact disk to thereby read out the information recorded thereon.

FIG. 18 shows one example of a conventional disk reproduction apparatus 290 to be loaded in an automobile in the vertical attitude. Referring to FIG. 18, the gravity affects on the operation of the pickup device 271 and, accordingly, circuit constants of a driving circuit of a servo-mechanism 272 for moving the pickup device 271 will have to be changed in consideration of the affection of gravity.

The pickup device 271, for this reason, is loaded with a holder H of the type shown in FIG. 19. The holder H comprises a base plate 273 and a support plate 274 perpendicularly suspended from the base plate 273. Suspension wires 279 and 279 extend from the support plate 274 and an objective lens unit 1 is located to the front ends of the suspension wires 279 through a frame member 275. Two electromagnet mechanisms 276 and 276 are disposed at front and rear portions of the frame member 275 and two permanent magnets 277 and 277 are supported outward of the electromagnet mechanisms by two support plates 278 and 278. The objective lens unit 1 can be controlled and positioned by controlling the electromagnet mechanisms 276 and 276.

In the conventional apparatus shown in Figs. 17 to 19, however, since the objective lens unit 1 of the pickup device 271 is supported in a floating manner by the suspension wires 279 as shown in FIG. 19, the objective lens unit 1 is affected with gravity of the tracking direction and the focusing direction in a case where the CD reproduction apparatus 290 is disposed in the vertical attitude as shown in FIG. 18 and, hence, it is necessary to control the servo-mechanism 272 in consideration of the affection of gravity. Moreover, when the pickup device 271 is displaced vertically in the radial direction of the compact disk d, it will be required to change the circuit constants of a driving circuit of a carriage survo of the servo-mechanism 272 in accordance with gravity to be applied in a case where the pickup device 271 is displaced vertically downwardly from the upper position thereof or in a case where the pickup device 271 is displaced vertically upwardly from the lower position thereof. This makes the working operation of the CD reproduction apparatus troublesome, thus being inconvenient.

The present invention, in another aspect, was conceived to solve the problems encountered to the prior art described above and will be described hereunder with reference to FIGS. 13 to 16 as a third embodiment according to this invention, in which like reference numerals are added to elements or members corresponding to those shown with respect to the first embodiment.

FIG. 13 shows a disk reproduction apparatus 201 comprising an outer casing 2 in which a support frame 3 is accommodated. A magazine Ma is loaded in the support frame 3.

FIGS. 14 and 15 represent the horizontal and vertical arrangements of the CD reproduction apparatus 201 of the present invention. The apparatus 201 is replaced to the horisontal position as shown in FIG. 14 from the vertical position as shown in FIG. 15 and the rotation of the rotating plate 12 is detected by a detecting switch 240 as a detecting means located to a position suitable for detecting the movement of the rotating plate 12. The detecting switch 240 operates when it abuts against the projecting end 12a of the rotating plate 12 when it is replaced from the horizontal position (FIG. 14) to the vertical position (FIG. 15). As illustrated, two rotating plates 12 are provided for the support frame 3 and both the rotating plates 12 are mutually connected through link member L, so that when one of the rotating plates 12 is rotated by 90°, the other one thereof can be rotated by the same angles simultaneously.

Referring to FIG. 13, a pickup device 230 is located above the compact disk d to be movable along the horizontal direction of the support frame 3. The movement of the pickup device 230 is controlled by a servo-mechanism T, as shown in FIG. 16, along the radial direction of the compact disk d at a constant speed. The servo-mechanism T comprises a feed screw 233 with which an engaging portion 232 projected from the frame 231 of the pickup device 230 is screw-engaged. To the feed screw 233 is mounted a gear 234, with which a gear 235 is meshed. The gear 235 is mounted on the front end of an output shaft of a driving motor m which is connected to a servo-controller 236 which also controls an electromagnet mechanism 276 such as shown in FIG. 19.

The pickup device 230 is so arranged that the tracking direction of the pickup device 230 coincides with the horizontal direction even in both the cases of the horizontal and vertical arrangements of the disk reproduction apparatus. Accordingly, even in a case where the disk playback apparatus is placed in the vertical arrangement as shown in FIG. 16, the pickup device 230 is displaced in the horizontal direction, so that gravity of the self-weight of the pickup device does not adversely affect on the carriage operation of the pickup device 230. However, in the device of the type shown in FIG. 19 in which the objective lens unit 1 is supported by the suspension means, the position adjustment of the objective lens unit 1 is affected by gravity when the disk reproduction apparatus is replaced from the horizontal attitude to the vertical attitude. In order to obviate this defect, it is necessary to change the circuit constant of the driving circuit through which current for the electromagnet mechanism 276 in the focusing and tracking servo-mechanism passes in accordance with the attitude of the disk reproduction apparatus. With this point, according to this embodiment, the position of the rotating plate 12 is detected by the detecting switch 240, the servo-controller 236 is operated in response to an electric signal from the detecting switch 240, and hence, the electromagnet mechanism 276 can be controlled in response to an electric signal from the servo-controller 236, so that a current having a direction to cancell or deny gravity flows for exactly positioning the objective lens unit 1.

It is to be understood by persons skilled in the art that the present invention is not limited to the preferred embodiments described above and many other changes and modifications may be made without departing from the scopes of the appended claims.

What is claimed is:

1. A disk reproduction apparatus capable of being displaced between a horizontal attitude and a vertical attitude, comprising:

an outer casing;

a support frame means disposed inside said outer casing in a floating manner and loaded with a magazine in which a compact disk is mounted;

vibration proof means, disposed between said outer casing and said support frame means, for substantially preventing said support frame means from vibrating when said outer casing is vibrated;

reading means disposed opposite to said compact disk, said reading means being movable and adapted to read out information recorded on said compact disk; and means for controlling a displacement of said reading means;

said vibration proof means comprising a supporting means pivotally secured to a side surface of said outer casing, and spring means having one end engaged with said pivotal supporting means and the other end secured to a side surface, corresponding to said side surface of the outer casing, of said support frame means, at least one supporting means and one spring means being disposed on corresponding side surfaces of said outer casing and said support frame means.

2. A disk reproduction apparatus according to claim 1, wherein said other end of the spring means is pivotally secured to a portion lying on a horizontal plane passing a center of gravity of said support frame means in a case where the disk reproduction apparatus is arranged in a horizontal attitude.

3. A disk reproduction apparatus according to claim 1, wherein said supporting means of the vibration proof means comprises a rotating plate capable of rotating about a support pin supporting the rotating plate and provided with an end portion to which said one end of the spring means is secured.

4. A disk reproduction apparatus according to claim 3, wherein said rotating plate can be rotated from outside of said outer casing.

5. A disk reproduction apparatus according to claim 3, wherein said rotating plate is provided with a rotation position discriminating means for discriminating a rotating position of said rotating plate from a portion external to said outer casing.

6. A disk reproduction apparatus according to claim 5, wherein said discriminating means comprises an opening formed in the side surface of said outer casing in a range of rotation of said rotating plate and a discrimination portion formed on said rotating plate, the rotation position of said rotating means being visually discriminated when said discrimination portion is in registration with said opening.

7. A disk reproduction apparatus according to claim 3, wherein said supporting means of the vibration proof means is further provided with a rotation guiding means comprising a pair of arcuate openings formed in said rotating plate and arranged symmetrically with respect to said support pin and guide members secured to the side surface of the outer casing and adapted to be engaged with said openings, respectively.

8. A disk reproduction apparatus according to claim 7, wherein each of said arcuate openings is formed in a range constituting angles of 90° with respect to said support pin.

9. A disk reproduction apparatus according to claim 1, wherein a plurality of vibration proof means are disposed between corresponding side surfaces of said outer casing and said support frame means.

10. A disk reproduction apparatus according to claim 1, wherein a plurality of vibration proof means are disposed between corresponding side surfaces of said outer casing and said support frame means, each of said supporting means of the vibration proof means comprises a rotating plate capable of rotating about a support pin supporting the same and provided with an end portion to which said one end of the spring means is secured, and the rotating plates are interconnected through a link means so as to be rotatable in a synchronized manner.

11. A disk reproduction apparatus according to claim 1, wherein said other end of the spring means is pivotally secured to a portion lying on a horizontal plane passing a center of gravity of said support frame means in a case where the disk reproduction apparatus is arranged in a horizontal attitude and said supporting means of the vibration proof means comprises a rotating plate capable of rotating about a support pin supporting the rotating plate and provided with an end portion to which said one end of the spring means is secured.

12. A disk reproduction apparatus according to claim 11, wherein said rotating plate is rotated from outside of said outer casing.

13. A disk reproduction apparatus according to claim 11, wherein said rotating plate is provided with a rotation position discriminating means for discriminating a rotating position of said rotating plate from a portion external to said outer casing.

14. A disk reproduction apparatus according to claim 13, wherein said discriminating means comprises an opening formed in the side surface of said outer casing in a range of rotation of said rotating plate and a discrimination portion formed on said rotating plate, the rotation position of said rotating means being visually discriminated when said discrimination portion is in registration with said opening.

15. A disk reproduction apparatus according to claim 1, further comprising means disposed in association with said supporting means of the vibration proof means for detecting a displacement of said supporting means when the disk reproduction apparatus is changed in the attitude thereof and wherein said reading means is a pickup device and said control means is a servo-mechanism which is operated in response to an electric signal from said detecting means.

16. A disk reproduction apparatus according to claim 15, wherein said supporting means of the vibration proof means comprises a rotating plate capable of rotating about a support pin supporting the rotating plate.

17. A disk reproduction apparatus according to claim 15, wherein said pickup device is moved radially with respect to said compact disk.

* * * * *